Sept. 7, 1954
V. GEORGEFF
2,688,382
LUBRICATION INSURANCE SYSTEM FOR PRESSES
Filed Sept. 29, 1949
4 Sheets-Sheet 3
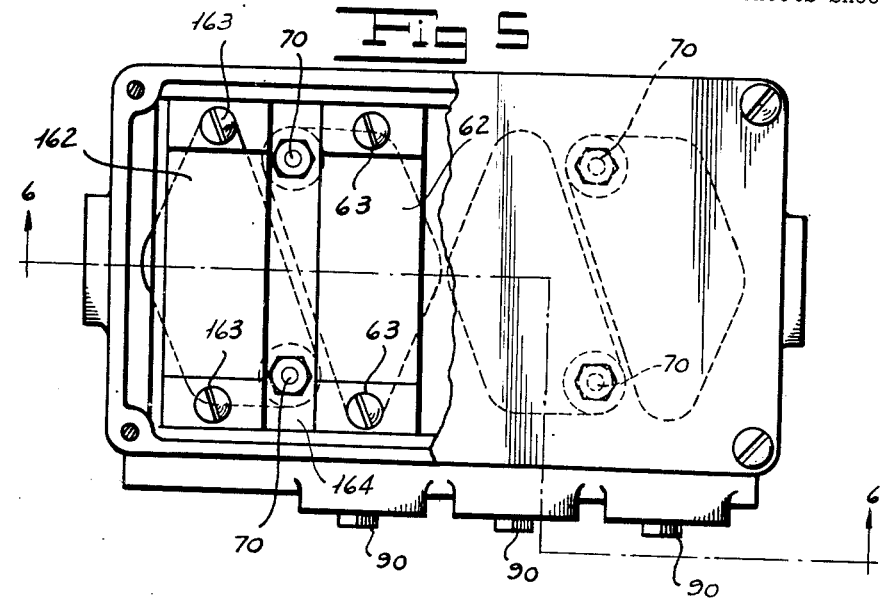
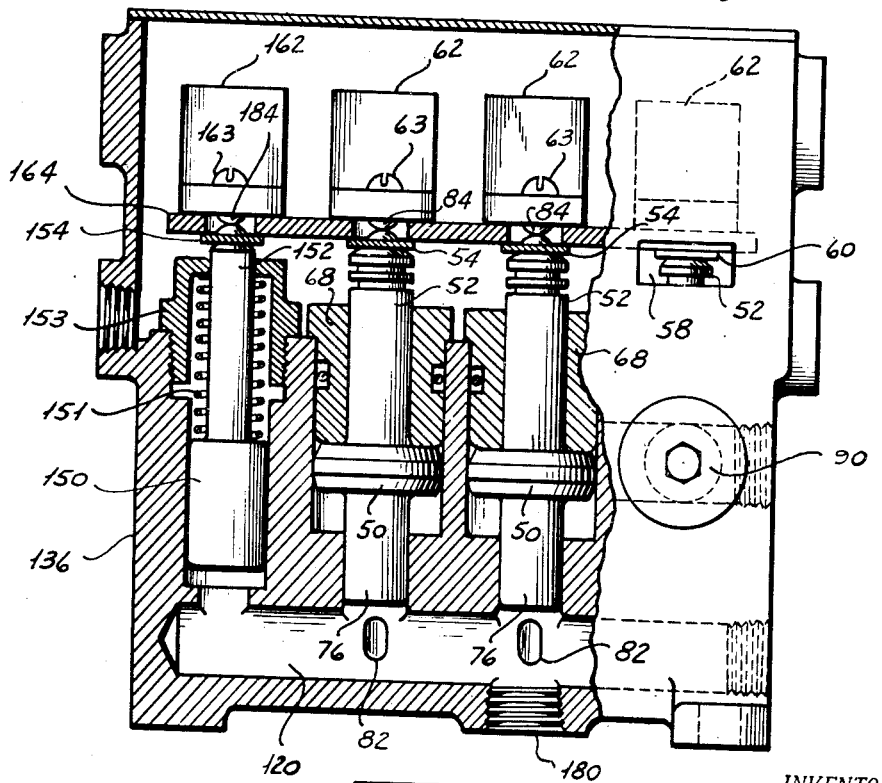
INVENTOR.
VASIL GEORGEFF
BY
Henry L. Shenier
ATTORNEY

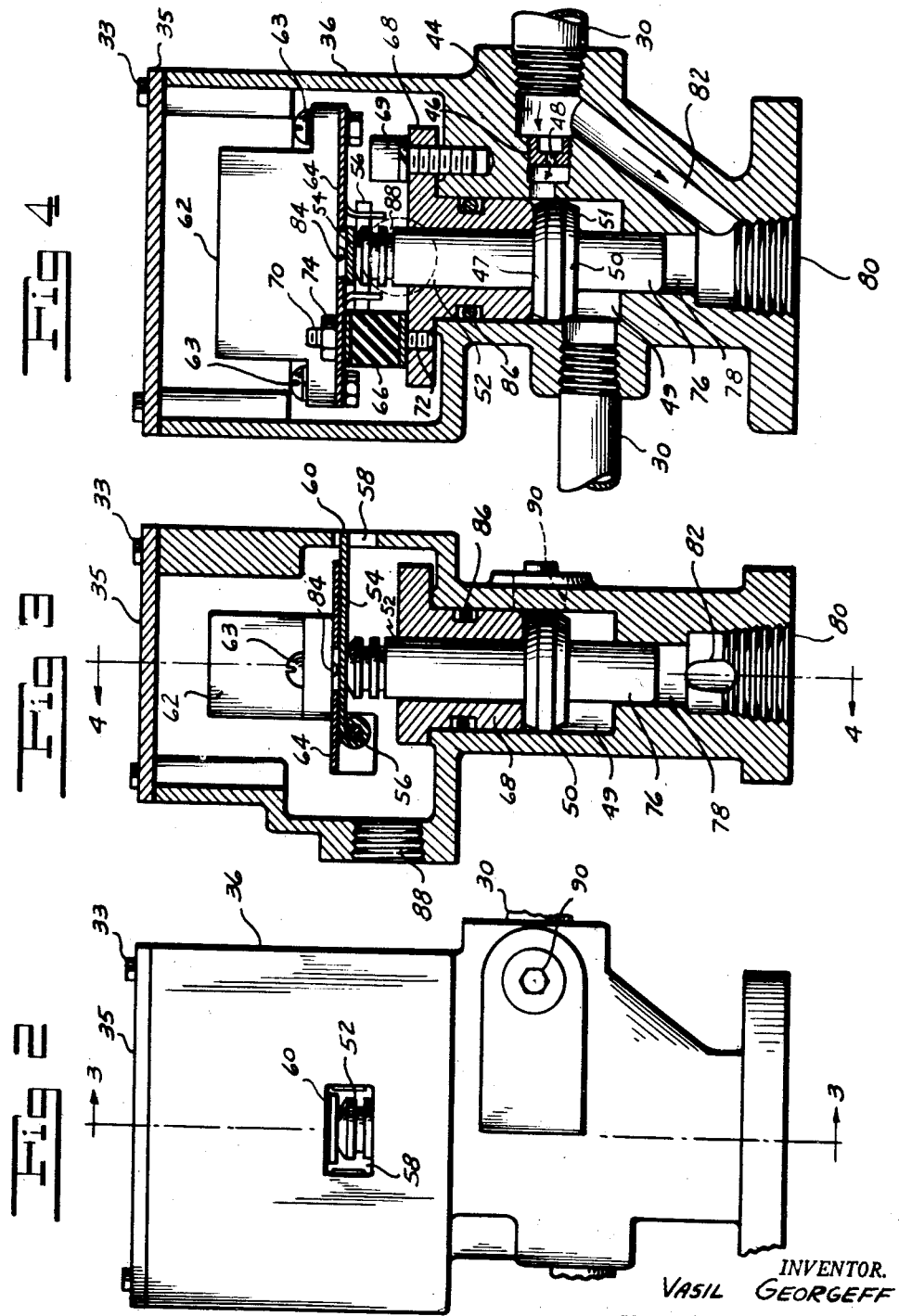

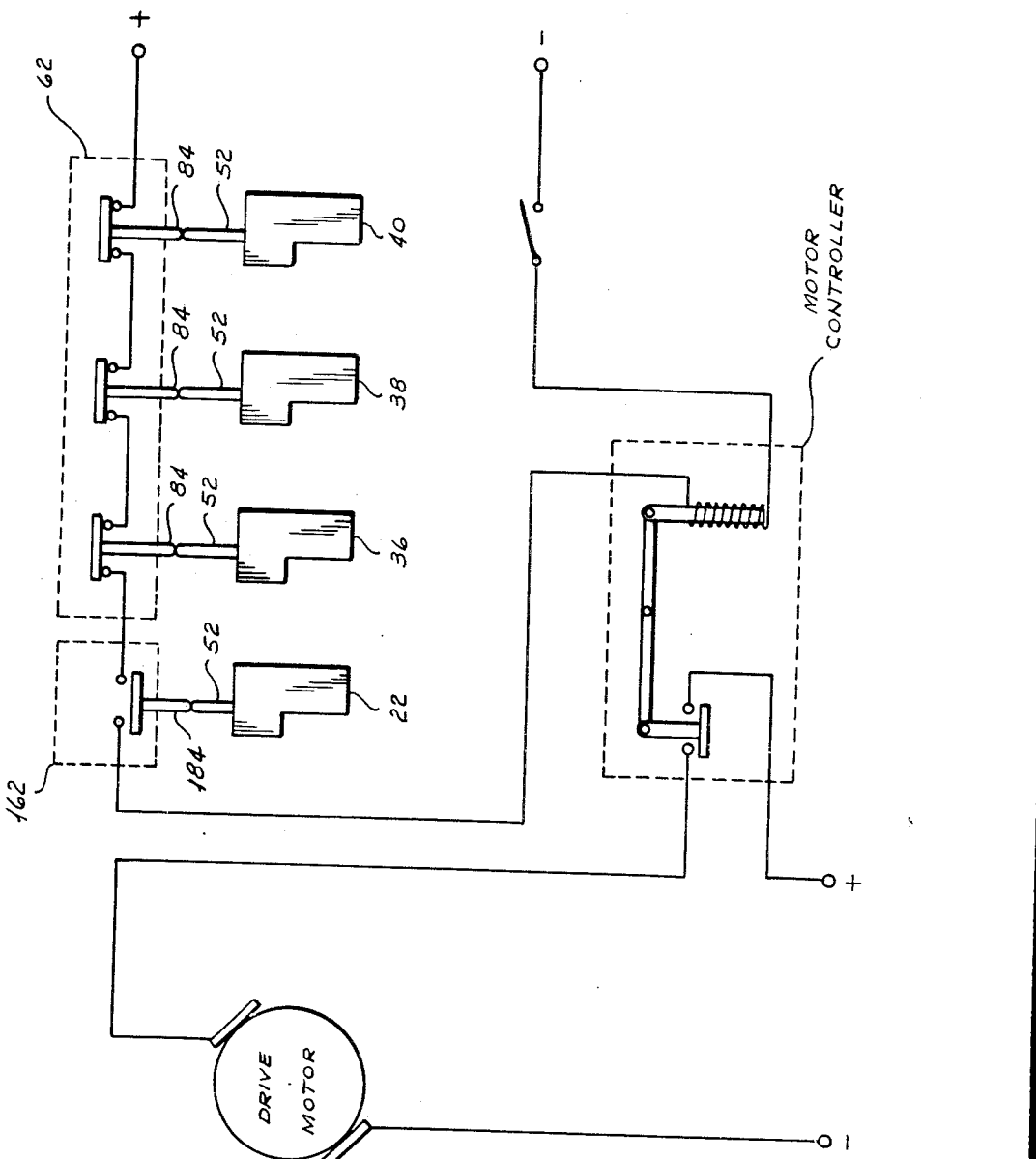

Patented Sept. 7, 1954

2,688,382

UNITED STATES PATENT OFFICE 2,688,382

LUBRICATION INSURANCE SYSTEM FOR PRESSES

Vasil Georgeff, Chicago, Ill., assignor to Danly Machine Specialties, Inc., Chicago, Ill., a corporation of Illinois Application September 29, 1949, Serial No. 118,540

10 Claims. (Cl. 184—6)

My invention relates to a lubrication insurance system for power presses and more particularly to a system in which lubricant is fed to various lubricated points in a power press at controlled rates, and in which the power press is automatically stopped when the lubricant supply as a whole fails or in event lubricant supply to one of the lubricated bearings or points ceases due to the clogging of the lubricant supply line to the particular lubricated point.

Power presses are large, expensive and heavy pieces of machinery, and until recently have been inadequately lubricated. It has been proposed to supply continuous forced fed lubrication to various bearings of a power press. Since these bearings are located in inaccessible places and points in event the lubricant supply is interrupted no indication will be received until damage is done. Since power presses frequently form part of a production line the failure of a power press will stop the entire line and represent a distinct economic loss. Then too, when a power press fails it is usually a time consuming and expensive task to repair it.

One object of my invention is to provide a system for insuring lubrication in a power press by providing means automatically to stop the power press in event the lubricant supply to a lubricated point is interrupted by a clogged line or in event the lubricant supply to the lubricating system fails.

Another object of my invention is to provide a simple and convenient lubricating insurance system for presses in which the press is automatically stopped upon failure of lubrication, and in which the particular bearing deprived of lubrication may be ascertained quickly and conveniently.

Another object of my invention is to provide an automatic system which upon the failure of lubricant supply to the lubricated bearings or parts will automatically stop the operation of the power press.

Other and further objects of my invention will appear from the following description.

In the accompanying drawings which form part of the instant specification and which are to be read in conjunction therewith, and in which like reference numerals are used to indicate like parts in the various views:

Figure 2 is a side elevation of a valve and switch unit forming part of my assembly.

Figure 3 is a sectional elevation taken along the line 3—3 of Figure 2.

Figure 4 is a sectional elevation taken along the line 4—4 of Figure 3.

Figure 5 is a multiple valve and switch unit showing another arrangement which may be used in my system with parts broken away.

Figure 6 is a sectional view taken along the line 6—6 of Figure 5.

Figure 7 is a diagrammatic view showing the control circuit for the driving motor of the press.

Figure 1:
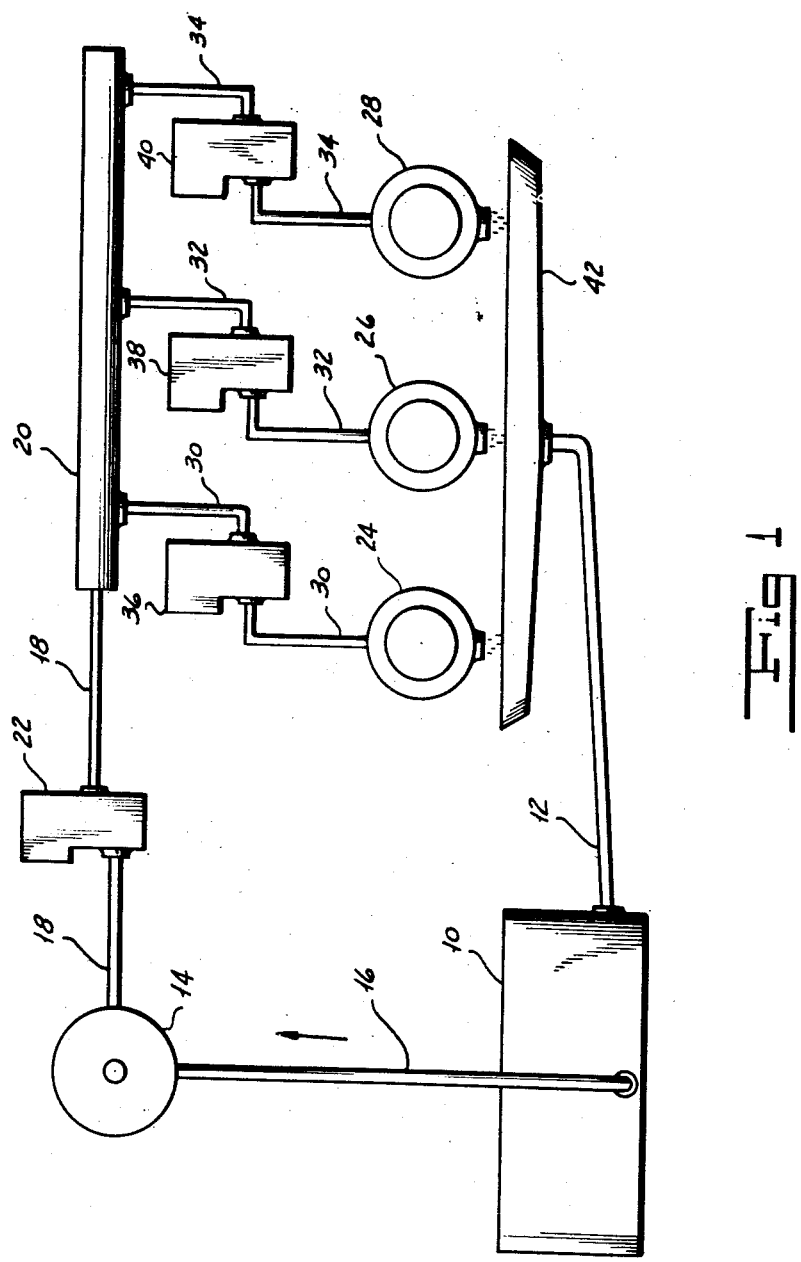
Figure 1 is a diagrammatic view showing a lubrication insurance system containing one embodiment of my invention.

In general my invention contemplates the provision of a circulating system in which oil is pumped from a reservoir to an oil distributing manifold. The line between the pump and the manifold is supplied with a valve adapted to control a switch. As long as oil pressure exists in the discharge of the pump the valve is held in the position to close a switch against the action of a spring. Upon the failure of oil pressure the spring moves the valve to permit a switch to open the circuit which operates the control mechanism of the press to stop it. Oil is fed from the manifold to various press bearings and parts which are to be lubricated. Each line between the manifold and a bearing has an interposed valve housing. Each of the lines is provided with an orificed plug adapted to control the rate of flow of the lubricant to the bearing. In event that the orificed plug becomes clogged or the line leading to the bearing becomes clogged, a valve is operated to actuate a switch. The switch is normally closed and is adapted to be opened by the clogging action just described. Each of the switches is in series with the control circuit for the press so that when any one of the switches is opened the press control will be actuated to stop the press. Each of the valve housings is provided with a visual indicator adapted to show the position of the switch associated therewith so that when the press is stopped the particular bearing causing the stoppage can be readily located.

Referring now to the drawings, a reservoir 10 adapted to hold a suitable lubricant such as a lubricating oil is provided with a pipe 12 through which the oil returning to the system flows into the reservoir. An oil circulating pump 14 is adapted to pump lubricant from the oil reservoir 10 through a pipe 16 and to discharge the oil being pumped through a pipe 18 leading to an oil distributing manifold 20. A control housing 22 is provided with a switch and a spring pressed piston, and its construction will be described more fully hereinafter. It is adapted to control the press to stop it upon failure of the lubricant supply through pipe 18. The oil from the manifold 20 is led to the various lubricated points such as bearings 24, 26, and 28, through pipes 30, 32, and 34. The pipe 30 has a switch and valve assembly housing 36 interposed in the line. The pipe 32 has a switch and valve assembly housing 38 interposed in its line, and a switch and valve assembly housing 40 is in series with the pipe line 34 supplying the bearing 28. Each of the switch and valve assemblies contained in housings 36, 38, and 40, are such that a controlled rate of lubricant supply is supplied to the respective bearings 24, 26, and 28, and such that if the lines 30, 32, and 34 to the bearings become clogged or the flow control orifice becomes clogged, the valve will operate to actuate the switch to operate the control mechanism to stop the press. The oil from the bearings 24, 26, and 28 flows into a collecting sump 42 and thence through pipe 12 back to the reservoir 10 for recirculation.

One of the housings of the group 36, 38, and 40, is shown in Figures 2, 3 and 4. The oil inlet pipe 30 to the housing opens into a chamber 44 which is provided with a plug 46 formed with a flow control orifice 48. The volume of oil flowing through the pipe 30 to the bearing is controlled by the size of the orifice 48 and is regulated to meet the requirements of the particular bearing being lubricated. A piston valve member 50 is provided with a valve stem or piston rod 52 contacting a member 54 pivoted about a pin 56. The end of the pivoted member 54 extends through an opening 58 so that the edge 60 thereof is visible clearly at the opening. A switch of any suitable construction is disposed in a housing 62 secured to a mounting plate 64 by means of bolts 63. The housing 36 is provided with a cover plate 35 secured by bolts 33 to permit the ready replacement and removal of the switch housing 62. The mounting plate is resiliently supported from a valve stem housing member 68. In Figure 4 I have shown one means for providing this resilient support. It comprises a three part bolt containing a central portion of rubber 66 to which is secured threaded end portions 70 and 72. The end portion 72 is screwed into the valve stem housing 68 which is in turn secured to the housing 36 by means of screws 69, and the threaded end 70 carries a nut 74 securing the mounting plate 64 to the valve stem housing 68. The lower end of the valve 50 is formed with a plunger 76 operating in a cylinder 78. The lower end of cylinder 78 is closed by a plug 80 and the oil chamber 44 and the cylinder 78 are interconnected by means of a duct 82. The area of duct 82 is such that the full oil pressure acts upon the plunger 76. The effective area of valve 50 is greater than the area under the plunger 76 so that the oil pressure through orifice 48 will normally move the valve 50 from the position shown in the drawings downwardly. A switch operating button 84 contacts the pivoted member 54 and is normally urged downwardly by means of a spring forming part of the switch construction (not shown). When the button 84 moves downwardly, that is, when the switch spring is allowed to push the member 84 downwardly, the circuit through the switch 62 is completed through the control mechanism of the press. An oil sealing ring 86 retards the leakage of oil between the housing 36 and the valve stem housing 68. If any oil leaks past the sealing ring 86 it is adapted to be drained through a drain opening 88 to which a drain pipe (not shown) is secured. An inspection opening closed by a plug 90 is provided so that the chamber 44 may be inspected to ascertain whether or not the orifice plug 46 is clogged or not.

Let us now assume that oil is being supplied through pipe 30 to the chamber 44. The pressure on top of the valve 50 exercised by the oil passing through the orifice 48 will be such as to overcome the pressure exercised by the oil upon the bottom of the plunger 76. The valve accordingly will move downwardly toward the bottom of the valve chamber 49. The pressure on the bottom surface 51 of the valve 50 will be negligible since the area of pipe 30 leading out of the chamber 49 is much greater than the area of the metering orifice 48. As long as metering orifice 48 is not clogged the valve will be toward the bottom of its chamber 49 and the pivoted member 54 will follow the valve stem or piston rod 52 downwardly under the influence of the spring behind the switch button 84, and the switch 62 will be in a position permitting the press to operate. If, however, the orifice plug 48 becomes clogged, for any reason the pressure of the oil on the top surface 47 of the valve 50 will be reduced so that the pressure acting upon the plunger 76 will force the valve upwardly to the position shown in the drawings, pivoting the member 54 to act against the switch button 84 to stop the press.

When this occurs the end 60 of the pivoted member 54 will be at the upper end of the window 58 adjacent the "off" position. A glance at the window will indicate that the line 30 is clogged. At this point the plugs 90 may be removed and the orifice plug 46 may be inspected, and may be cleaned through the opening normally closed by the plug 90. Let us now assume that the pipe 30 at its discharge end of the housing 36 becomes clogged. When this occurs pressure will build up in the line 30 in the valve chamber 49 and act against the surface 51 of the valve 50 balancing the pressure exercised on the top surface 47 of the valve 50. When this pressure is balanced or partially balanced to such an extent that it no longer opposes the pressure exerted by the plunger 76 the valve will move upwardly to the position shown in the drawings and operate the switch button 84 to stop the press. An inspection of the exterior of the housing 36 will reveal that the indicating end 60 of the pivoted member 54 is in the "off" position. The removal of plug 90 will reveal that the orifice 48 is not clogged and it will become immediately apparent then that the trouble has been caused by the clogging of line 30 from the housing 36 leading to the bearing being supplied.

The operation of my device can be more readily understood if it is remembered that as soon as the valve 50 opens slightly the pressure on top of the valve decreases due to the wire drawing effect between the edge of the valve and the wall of the cylinder leading to the discharge pipe 30. If the valve opens too much, the pressure of the lubricant being pumped exerted upon the bottom of the plunger 76 through branch channel 82 tends to close the valve. A balance is achieved where the pressure on top of the valve 50 of larger area balances the pressure on the plunger. The parts are thus positioned continuously to supply lubricant from the orifice 48 to the discharge pipe 30. If the orifice becomes clogged the plunger pressure will overcome the reduced pressure on top of the valve 50 and permit it to move upwardly beyond the balance point to operate the switch to stop the press. Similarly, if the discharge pipe 30 becomes clogged the pressure on the bottom of the valve 50 acting through the surface 51 will augment the pressure on the plunger 76 to move the valve upwardly to actuate the switch.

Instead of a plurality of individual housings 36, 38, and 40, and a separate oil supply housing 22, I may mount the various valves in a common housing such as shown in Figures 5 and 6. This has the advantage that when the press stops all of the indicating ends 60 are visible in one bank and the trouble can be located accurately and quickly. The mainfold housing 136 houses a plurality of valves 50 associated with corresponding switch housings 62 each having switch buttons 84 and pivoted members 54 operated by means of valve stems or piston rods 52 operating through valve stem housings 68. The valves and switch combinations comprising the three right hand switches in Figure 6, together with their associated valves, operate similar to the valve housing described above and shown in Figures 2, 3, and 4. The switch contained in switch housing 162, however, is different from those contained in the switch housings 62, in that when its button 184 is up in the position shown in the drawing, the switch is closed and not open. The piston 150 shown in the left hand view of the assembly corresponds to the piston contained in the housing 22 in Figure 1, and is normally urged downwardly by means of a spring 151 acting against spring cap member 153. The pivoted member 154 associated with the piston stem 152 is adapted to act against the button 184 of the switch 162. The mounting plate 164 which carries the switch housings 162 and 62 is mounted by four rubber bolts, such as shown in Figure 4, the upper ends 70 of which appear in Figure 5. The switch housings 62 are secured to the mounting plate 164 by means of machine screws 63 and the switch housing 162 is secured to the mounting plate 164 by means of machine screws 163. The plunger 76 carried by the valve 50 and the piston 150 communicates with an oil inlet mainfold 120 to which the oil is supplied through an opening 180. The oil which flows to the parts being lubricated passes through ducts 82 to corresponding oil chambers 44, as shown in Figure 4, and thence through orifice plugs similar to orifice plugs 46 shown in Figure 4, the action of valves 50 in the form of the invention shown in Figures 5 and 6 being the same as that shown in Figures 2, 3, and 4. The oil pressure from the manifold 120 acts against the piston 150 and moves it upwardly against the action of spring 151 closing the operating circuit through switch 162. If the oil pressure to the manifold 120 should fail the spring 151 will move the piston 150 downwardly together with its piston stem 152 and permit the switch button 184 to operate to break the circuit and stop the press. The assembly shown in Figures 5 and 6 is that shown diagrammatically in Figure 1, all of the valves, however, being housed in a single housing.

It is to be noted that in Figure 4 oil is introduced through hight-hand pipe 30 and flows downwardly through duct 82 to the chamber 78, the bottom plug 80 being inserted to seal the chamber. In Figure 6 the oil is introduced into the chamber 120 and flows upwardly through branch duct 82 to the orifice plugs 48. It will be noted that the oil pressure of the supply in both cases is introduced to the bottom of the plunger 76 and to the inlet side of the orifice plug 48.

It will be observed that I have mounted the switch housings 62 and 162 on mounting plates supported from the valve housings through rubber supporting means. The reason for this is that I have found that with heavy presses the jarring occasioned by the press action may inadvertently open one of the switches controlling the press and hence stop the press even when lubricant is supplied. In order to avoid this possibility of accidental opening of the switches, I mount the switch housings in a shock proof mounting so that the jar occasioned by press operations will not operate any of the switches to stop the press.

It will be observed further that in the arrangement which I have described the switch controlled by housing 22 and the switches controlled by housings 36, 38, and 40, are in series with the control circuit for the press, and that the control circuit is such that upon its interruption the press will automatically stop. It will be clear to those skilled in the art that I may provide press stopping circuits auxiliary to the main control circuit of the press, such that upon the operation of any of the switches the press will stop. This will require, however, a plurality of circuits in parallel and is not as simple, convenient or inexpensive as providing a circuit in which all of the control switches are in series, so that the opening of any one of them will operate the single press stopping circuit. It will be clear further that the series circuit may form part of the main control circuit, if this is of the type where the interruption of a circuit will stop the press, or may form part of a separate press stopping circuit adapted to set the brake and release the clutch of the power press thereby stopping its action upon the failure of lubrication.

It will be seen that I have accomplished the objects of my invention. I have provided a system for insuring lubrication in power presses by means which automatically stop the press in event the lubricant supply to a lubricated point is interrupted by a clogged line or in event the lubricant supply to the entire lubricating system fails. I have provided a simple and convenient insurance system in which the press is automatically stopped by failure of lubrication. I have provided means in which when the press is stopped the lubricant failure which occasioned the press stoppage can be quickly and accurately determined so that the repairs may be made reducing the down time of the press to a minimum.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A machine including in combination a control switch, means for supplying lubricant under pressure to a machine part, means responsive to the lubricant pressure for actuating the switch, in which said means responsive to lubricant pressure comprises a first cylinder, a piston valve positioned in said first cylinder, a piston rod carried by said piston valve, a plunger carried by said piston valve, a second cylinder, said plunger being positioned in said second cylinder, a metering means providing communication between the lubricant supply means and said first cylinder above said piston valve, means providing communication between the lubricating supply means and said plunger cylinder, the area of the piston valve being greater than the area of said plunger, said piston rod being adapted to operate said switch, means communicating with said first cylinder below said piston valve for passing lubricant to the machine part being lubricated, the construction being such that the pressure of lubricant on top of said piston valve will normally overcome lubricant pressure on said plunger whereby to move said piston rod to a position permitting the switch to occupy a machine operating position, and when supply of lubricant to said first cylinder becomes diminished the pressure of the lubricant in said second cylinder will move said piston rod to operate said switch to stop the machine.

2. A machine including in combination a control switch, means for supplying lubricant under pressure to a machine part, means responsive to the lubricant pressure for actuating the switch, in which said means responsive to lubricant pressure comprises a first cylinder, a piston valve positioned in said first cylinder, a piston rod carried by said piston valve, a plunger carried by said piston valve, a second cylinder, said plunger being positioned in said second cylinder, a metering means providing communication between the lubricant supply means and said first cylinder above said piston valve, means providing communication between the lubricating supply means and said plunger cylinder, the area of the piston valve being greater than the area of said plunger, said piston rod being adapted to operate said switch, means communicating with said first cylinder below said piston valve for passing lubricant to the machine part being lubricated, the construction being such that the pressure of lubricant on top of said piston valve will normally overcome lubricant pressure on said plunger whereby to move said piston rod to a position permitting the switch to occupy a machine operating position, and when supply of lubricant to said first cylinder becomes diminished the pressure of the lubricant in said second cylinder will move said piston rod to operate said switch to stop the machine, and when the means for passing lubricant from said first cylinder to the part being lubricated becomes clogged the balancing of the pressure above and below said piston valve in said first cylinder will permit the plunger to move the piston rod to operate the switch to stop the machine, and means operated by the movement of said piston rod for indicating that the switch has moved to machine stopping position.

3. A machine including in combination a plurality of control switches, means for supplying lubricant to a machine part, means responsive to the lubricant pressure for operating the switches, said means responsive to lubricant pressure for actuating the switches comprising a plurality of housings each formed with a first cylinder and a second cylinder, respective valves positioned in said first cylinders, respective plungers carried by said valves positioned in respective second cylinders, means for supplying lubricant to respective first cylinders above respective valves, respective orificed metering plugs positioned in said means, means for supplying lubricant to respective second cylinders, means for withdrawing lubricant from respective first cylinders below respective valves, respective piston rods carried by said valves adapted to actuate respective switches associated with the respective piston rods, the construction being such that when an orificed metering plug becomes clogged or a lubricant withdrawal means becomes clogged the lubricant pressure acting upon the plunger will actuate the piston rod associated with the clogged means to operate the switch associated therewith to stop the machine.

4. A power press including in combination a housing, a plurality of first cylinders formed in said housing, a plurality of second cylinders formed in said housing, respective valves positioned in said first cylinders, plungers carried by respective valves and positioned in said second cylinders, means for supplying lubricant to said second cylinders beneath the plungers, means for supplying lubricant to said first cylinders above said valves, said last named means having respective orificed metering plugs positioned therein, respective means for withdrawing lubricant from said cylinders below said valves for passage to press parts being lubricated, respective piston rods carried by said valves, respective switches positioned adjacent said piston rods and adapted to be operated thereby, the construction being such that the pressure of lubricant on top of said valves will normally overcome the pressure of the lubricant upon said plungers to position the respective piston rods to move respective switches to press running position.

5. A power press as in claim 4 in which said housing is formed with a third cylinder, a plunger positioned in said cylinder, a switch adapted to be actuated by the movement of the plunger, a spring normally biasing the plunger to move to operate the switch to stop the press, and means providing communication between the lubricant supply and the cylinder beneath the plunger whereby to move the plunger against the action of the spring to permit the switch to move to press operating position when the lubricant supply pressure reaches a predetermined value.

6. A power press including in combination a plurality of switches for controlling the press, means biasing one of said switches to open position and means biasing the other of said switches to closed position, means for supplying lubricant under pressure to a plurality of press parts, a first means responsive to lubricant pressure for closing the open one of said switches to position the switch in a press running position, a plurality of second pressure responsive means responsive to lubricant supply pressure to respective press parts for moving respective closed switches to press stopping position when lubricant supply pressure to a respective press part becomes diminished.

7. A power press as in claim 6 in which said first pressure responsive means comprises a cylinder, a piston positioned in said cylinder, a piston rod adapted to actuate the switch, a spring normally moving the piston and piston rod to actuate the switch to stop the press, and means for introducing lubricant under the pressure of the lubricating system to the cylinder behind the piston to overcome the action of the spring to position the switch in press running position.

8. A power press as in claim 6 in which each of said second pressure responsive means comprises a first cylinder, a piston valve positioned in said first cylinder, a piston rod carried by said piston valve and adapted to actuate the switch associated therewith, a second cylinder, a plunger positioned in second cylinder, said plunger being attached to said piston valve for movement therewith, an orificed metering plug providing communication between the lubricant supply and the first cylinder above the piston valve, means providing communication between the lubricant supply and said second cylinder, means providing communication between the first cylinder below the piston valve and the press part being lubricated, the cross-sectional area of said piston valve being greater than the cross-sectional area of said plunger, the construction being such that the lubricant pressure on top of the piston will normally overcome the lubricant pressure upon the plunger when there is free flow through the metering plug to the first cylinder and free flow from the first cylinder to the press part being lubricated whereby to move the piston rod to operate the switch to position it in press running position and when either the metering plug becomes clogged or the means providing communication between the first cylinder and the press part becomes clogged the plunger will move under the influence of the lubricant supply pressure to move the piston rod to actuate the switch to stop the press.

9. A power press including in combination a plurality of working parts, a lubricant supply reservoir, a manifold, means for pumping oil from the lubricant reservoir to the manifold, a plurality of branch ducts providing communication between the manifold and the press parts being lubricated, means for draining oil from the press parts for passage back to the reservoir, a plurality of switches, means for biasing one of said switches to open position, means for biasing the other of said switches to closed position, a first pressure responsive means, means providing communication between the pump discharge pressure and said first pressure responsive means for closing said open switch, a plurality of second pressure responsive means in each of said branch ducts for opening said closed switches, the construction being such that upon the failure of the lubricant supply pressure said biasing means will move one of said switches to open position and upon a diminishing of the lubricant pressure in any of the branch ducts below a predetermined point that one of said closed switches will open to stop the press.

10. A power press as in claim 9 in which each of said second pressure responsive means comprises a piston valve and a plunger the piston valve adapted to be actuated by the supply pressure of oil to the press part being lubricated, the plunger opposing the piston valve adapted to be actuated by the lubricant manifold supply pressure, the piston valve being greater in cross-sectional area than the plunger whereby upon clogging of lubricant supply to the piston valve the plunger will move the assembly to open the switch to stop the press.

References Cited in the file of this patent

UNITED STATES PATENTS

| Number | Name | Date |
|---|---|---|
| 1,289,903 | Pogue | Dec. 31, 1918 |
| 1,687,627 | Marden | Oct. 16, 1928 |
| 1,808,914 | Bennett | June 9, 1931 |
| 1,975,748 | Holman | Oct. 2, 1934 |
| 2,178,642 | Ott | Nov. 7, 1939 |
| 2,502,318 | Fischer | Mar. 28, 1950 |